Nov. 10, 1953 A. F. ROCK 2,658,936
DRY CELL BATTERY
Filed Jan. 19, 1949 2 Sheets-Sheet 2

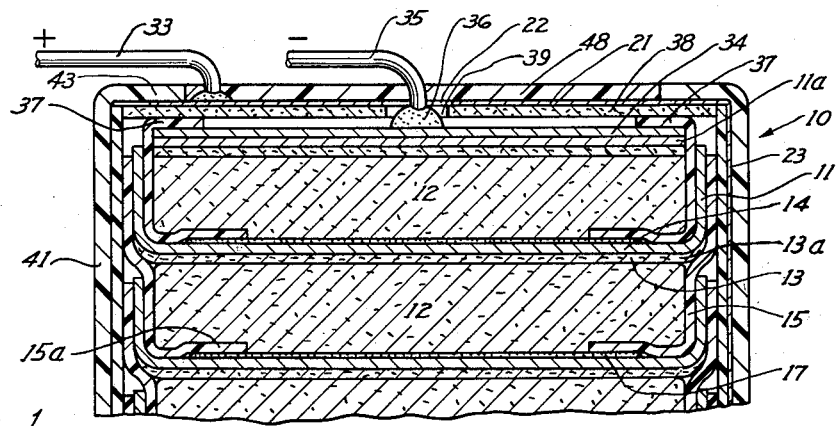
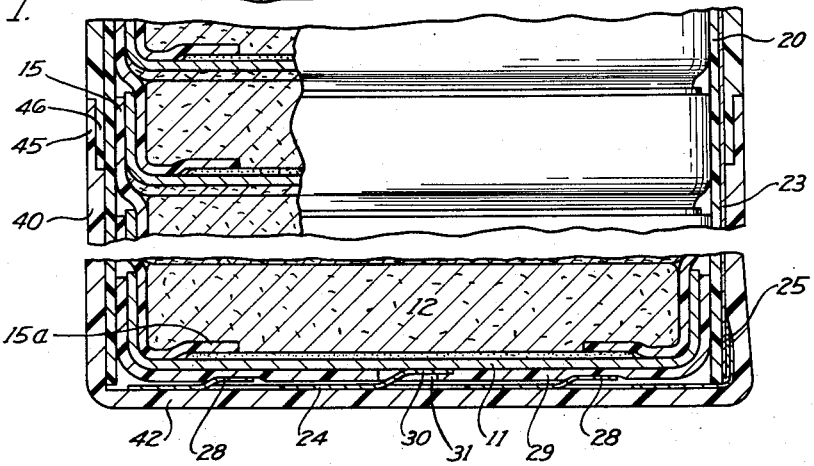
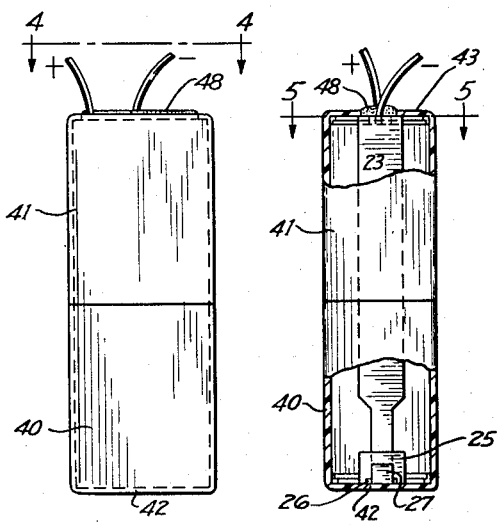

INVENTOR.
ARTHUR F. ROCK
BY Bosworth & Sessions
ATTORNEYS.

Patented Nov. 10, 1953

2,658,936

UNITED STATES PATENT OFFICE 2,658,936

DRY CELL BATTERY

Arthur F. Rock, Lakewood, Ohio, assignor to General Dry Batteries, Inc., Lakewood, Ohio, a corporation of Ohio Application January 19, 1949, Serial No. 71,625

11 Claims. (Cl. 136—111)

This invention relates to dry cell batteries and more particularly to batteries made up of a plurality of dry cells stacked together in series. This application constitutes a continuation in part of my copending application Serial No. 634,651, filed December 13, 1945, now Patent No. 2,475,152, issued July 5, 1949, and a method suitable for assembly of cells embodying the present invention is disclosed and claimed in my copending application Serial No. 634,652, filed December 13, 1945, now Patent No. 2,475,153, issued July 5, 1949.

Batteries of the wafer type are widely used in hearing aids, radios and for other services where it is necessary to employ a plurality of cells connected in series and where compact batteries are required. For example, for some requirements a fifteen cell battery must fit within a space about 3½" high by 1½" wide by ¾" thick. My Patent No. 2,475,152 aforesaid discloses an advantageous construction for such batteries in which the active materials are disposed within shallow zinc cups but in which the exterior of the bottoms of the zinc cups constitute the active zinc surfaces rather than the interior surfaces of the zinc as is customary in most batteries. The present invention relates to batteries in which the exterior surfaces of the bottoms of the zinc cups constitute the active zinc surfaces, and a general object of the invention is to provide batteries of this type in which efficient use is made of the space within the zinc cups, in which the resistance of the individual cells is kept at a minimum and which can be manufactured economically and efficiently.

Briefly, I attain these desired characteristics and other advantageous results by constructing batteries generally in accordance with the disclosure of my Patent No. 2,475,152 aforesaid, but by eliminating the molded or extruded carbon electrodes such as the buttons specifically disclosed in said application and substituting therefor thin flat carbon electrodes of greater area and less volume. In addition I preferably employ only a single piece of battery paper in contact with the exterior of the zinc cups of each cell and extending around the corners of the exteriors of the bottoms of the zinc cups thereby preventing the possibility of contact between fragments of the mix cake without requiring the battery paper wrapping around the sides of the mix cakes specifically disclosed in my aforesaid applications.

Figure 6:
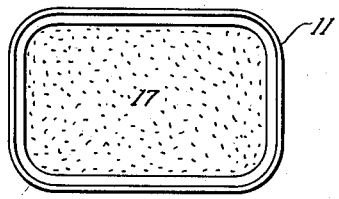
Figure 7:
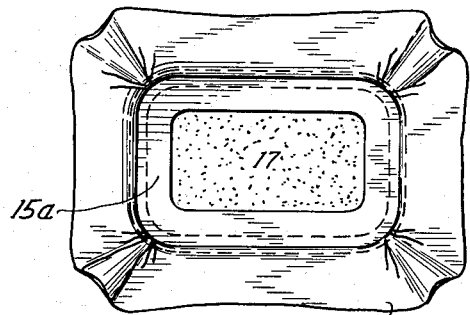
Figure 8:
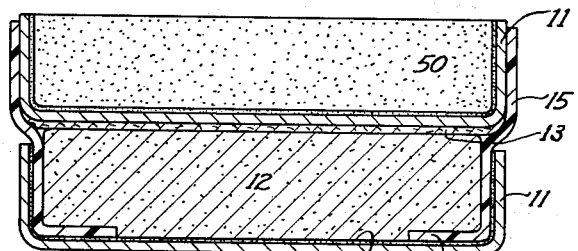
Figure 9:
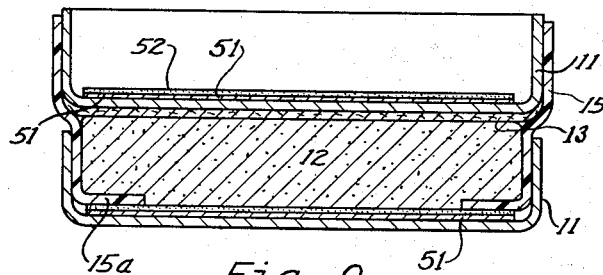
Figure 10:
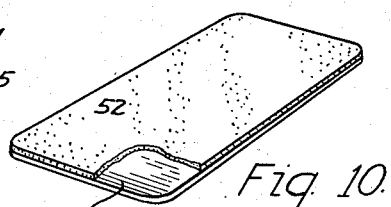
Figure 11:
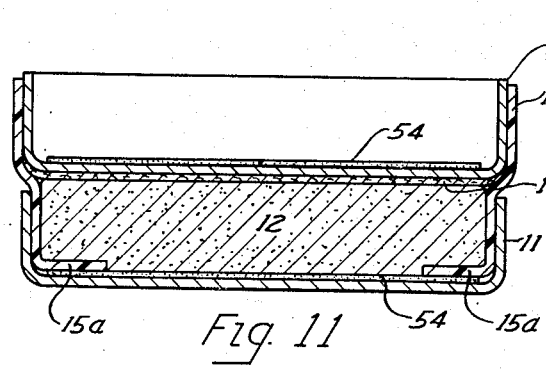
Figure 12:
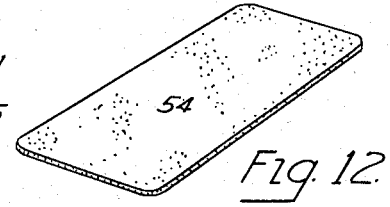

Further objects and advantages of the invention and details of the construction will become apparent from the following description of preferred forms thereof, reference being made to the accompanying drawings in which Figure 1 is a longitudinal sectional view illustrating a preferred form of battery embodying my invention, the section being taken as indicated by the line 1—1 of Figure 4; Figure 2 is a side elevational view on a reduced scale of the battery shown in Figure 1; Figure 3 is an end elevational view of the battery shown in Figure 1 with parts of the casing broken away; Figure 4 is a top plan view as indicated by the line 4—4 on Figure 2; Figure 5 is a sectional view taken along the line 5—5 of Figure 3; Figure 6 is a plan view of one of the zinc cups utilized in the battery shown in Figure 1; Figure 7 is a plan view of the zinc cup of Figure 6 and showing a thin piece of sheet insulating material in place within the zinc cup; Figure 8 is a sectional view of a portion of a battery illustrating a cell embodying a modified form of carbon electrode; Figure 9 is a similar sectional view illustrating a cell embodying another modified form of carbon electrode; Figure 10 is a perspective of the carbon electrode of the cell of Figure 9; Figure 11 is a sectional view similar to Figure 8 and illustrating a cell embodying a further modification of carbon electrode; and Figure 12 is a perspective of the carbon electrode of the cell of Figure 11. Throughout the drawings, the thickness of various thin materials are exaggerated for convenience of illustration, and the thicknesses shown are not necessarily in correct proportion to each other.

Referring now to Figure 1 of the drawings, a preferred form of battery indicated in general at 10 comprises a plurality of wafer-like cells stacked together in series. Each cell consists of a shallow zinc cup 11 which may be of any convenient shape, but which is preferably rectangular as shown in order to make efficient use of space. Each zinc cup contains a mass of depolarizing mix 12 which contains electrolyte. The usual separator is preferably constituted by a layer of paste-coated battery paper 13 disposed in contact with the upper surface of each mass of mix and with the outside of the bottom of the adjacent zinc cup. As shown at 13a the battery paper preferably extends at least part way around the rounded juncture of the bottom 14 of the adjacent zinc cup with the sides thereof. The battery paper thus is of greater area than the upper surface of the mass of mix and prevents loose particles of mix dislodged from the mix cake from making accidental contact with the exterior of the adjacent cup.

In order to insulate each mass of mix from direct contact with the zinc cup within which it is contained and to prevent contact between adjacent zinc cups, I preferably employ with each cell a thin layer 15 of flexible insulating material which is impervious to electrolyte. The insulating material, which preferably is in the form of a sheet, may consist of a thin sheet of Koroseal (vinyl chloride copolymer) or Pliofilm (rubber hydrochloride) or other plastic insulating material that is impervious to the electrolyte. The sheet of insulating material 15 extends within the zinc cup between the mix cake and the side walls of the cup and extends partially beneath the mix cake as indicated at 15a. Each sheet, however, has an opening in the portion thereof beneath the bottom of the mix cake through which the mix cake makes contact with the positive electrode 17.

In order to provide an efficient positive electrode of low resistance and which is impermeable to the electrolyte, the electrode 17 preferably is constituted by a thin layer of conductive varnish or lacquer containing finely divided carbon. Such conductive varnishes and lacquers are well known in the art and may consist of a varnish or lacquer vehicle containing a sufficient percentage of finely divided carbon to give the composition the required conductivity, the vehicle being impermeable to the electrolyte contained in the mix.

In the modification of the invention shown in Figures 1 to 7, the carbon electrode is provided by coating the interior of the zinc cups 11 after the zinc has been drawn into the desired cup-shaped form. The coating extends close to the side walls of the zinc cups as shown in Figure 6, but need not be applied with any great accuracy or regularity inasmuch as the opening in the insulating sheet material 15 is substantially smaller than the area of the bottom of the zinc cup and as shown in Figure 7 overlaps the coating 17 to a sufficient degree that the sheet will separate the mix from direct contact with the zinc even though the boundaries of the coating 17 are irregular and not accurately centered within the cup. Thus, by reason of the overlapping of the flexible sheet insulating material over the thin flat carbon electrode layer, possibility of contact of the electrolyte with the interior of the zinc cup is eliminated.

It will be noted that, with the exception of the uppermost sheet 15, each sheet 15 extends upwardly beyond the zinc cup within which it is disposed along the exterior of the next adjacent zinc cup to a zone near the top thereof, thus insulating adjacent cups from each other. Each sheet engages the curved portion 13a of the adjacent battery paper 13, and the overlapping arrangement of the sheets 15 with adjacent zinc cups prevents intermingling of the electrolyte of one cell with the electrolyte of an adjacent cell. With this arrangement of cells, the exterior of the bottom surface of each zinc cup constitutes the active surface, the mix cake disposed within any given zinc cup being insulated therefrom by the insulating sheet 15 except for the electrical contact provided through the opening in the bottom of the sheet 15 and the carbon electrode 17 which is impervious to the electrolyte.

The cells may be assembled in any convenient manner; for example, the assembly may be carried out in accordance with the method disclosed and claimed in my copending application Serial No. 634,652 aforesaid, the stack of cells being disposed within a tubular jacket 20. Jacket 20 preferably is composed of a plastic insulating material which is impervious to the electrolyte, cellulose acetate butyrate being a suitable material, although other electrolyte-resistant insulating materials, such as polystyrene, various vinyl plastics and other thermoplastic materials may be employed. The jacket is open at both ends, and the cells are retained within the jacket and held in series contact by means of a metal strap disposed on the exterior of the jacket as shown in Figures 1, 3 and 5, and comprising a top plate 21 apertured as at 22, side portions 23 formed integrally with the top plate 21, and a separately formed bottom plate 24 having upwardly extending tongues 25, there being apertures 26 at the intersections of the tongues 25 with the plate 24 through which the ends 27 of the side members 23 extend (see Figures 1 and 3), the ends 27 being bent upwardly as shown to secure the parts together, sufficient pressure being applied to the stack of cells to insure that good contact is made between the successive cells of the stack.

In order to hold the cells in the stack resiliently in engagement with each other and to provide a positive terminal for the stack, the bottom plate 24 of the securing strap preferably is provided with three upwardly extending tongues. Two of these, indicated at 28, resiliently engage a lower-most sheet 29 of plastic insulating material, while the central tongue 30 extends through the opening 31 in the sheet 29, into contact with the lower-most zinc cup 11. The number of tongues may be varied, and if desired, all of the tongues may make contact with the zinc cup. In any event, all of the tongues exert a force upon the bottom zinc cup, and one of the tongues makes electrical contact therewith. Thus, the strap becomes in effect the positive terminal of the battery, and to provide for convenient connection of the battery to an external circuit, a terminal wire 33 is soldered to the metal top plate 21 of the securing strap.

At the upper end of the battery, the negative element of the top cell is provided by a zinc plate 11a, a cup being unnecessary in this location. This zinc plate 11a is engaged by a zinc terminal plate 34 to the center of which the negative terminal member 35 is soldered as indicated at 36. The plastic insulating sheet 15 of the uppermost cell is folded over the periphery of the terminal plate 34 as shown at 37, and a rectangular insulating disk 38, composed of insulating fiber or the like, is disposed over the portions 37 and over the terminal plate 34. The disk 38 has an opening 39 therein through which the terminal 35 extends, and the disk 38 is clamped in place by the top plate 21 of the metal retaining strap.

By this construction, the several cells making up the battery are held in proper series contact with each other, and the terminals are provided for connecting the battery to an external circuit.

In order to seal the battery to prevent ingress of air and undue loss of moisture, I may enclose the entire assembly of cells, jacket and strap within a casing composed of plastic insulating material, the materials noted above for the jacket 20 being suitable for the casing. As shown particularly in Figures 1 to 4, the casing is made up of a bottom portion 40 and a top portion 41. The bottom portion 40 has a closed lower end 42, while the upper end 43 of the top portion 41 is apertured as at 44. The bore of the upper open end of the bottom portion is enlarged as at 45, while the external dimensions of the upper portion adjacent the lower end thereof are reduced as at 46 to enable the parts to telescope together, providing an overlapping joint with the internal and external dimensions of the parts in the region of the joints being substantially the same as in the remaining portions.

The two parts of the casing are slipped onto the battery assembly, the two halves of the casing preferably being cemented together by a cement having a solvent action on the plastic; the terminal members 33 and 35 extend upwardly through the opening 44 as shown in Figures 1, 2 and 4. The opening 44 is then sealed with a suitable sealing material 48. The seal 48 thus completes the sealing of the battery within the casing. There is sufficient diffusion of gases through the seals and the walls of the plastic casing to prevent the building up of unduly large pressures within the casing.

It is to be understood that batteries embodying the present invention may be assembled with casings or enclosures of various types, and that the invention is not limited to the type of assembly just described.

In Figures 8 to 12, inclusive, I have disclosed modified forms of cells embodying the present invention. In Figure 8 the cells are constructed just as previously described with zinc cups 11, mix 12, battery paper 13 and flexible sheet insulating material 15. Here, however, the carbon electrode 50 consists of a coating of conductive lacquer or varnish such as used to provide the previously described electrode 17, but in this case the conductive lacquer or varnish is applied over an entire sheet or strip of zinc and thereafter the cups 11 are stamped or drawn from the coated strip. Thus, in the modification shown in Figure 8, the carbon electrode material covers the entire interior surface of each zinc cup 11.

In the form of the invention shown in Figures 9 and 10, the zinc cup, mix cake, battery paper separator and sheet insulating material are again constituted as before and bear the same reference characters, but here the carbon electrode consists in a thin sheet of metal (preferably zinc) foil 51 having a layer of conductive varnish or lacquer 52 coated thereon. In this construction a conductive varnish or lacquer of the type previously described is coated on a sheet or strip of thin zinc foil and thereafter the coated material is cut, as by suitable dies, into pieces such as shown in Figure 10. One of these coated pieces is then disposed in each cup 11 of the battery. It will be noted that portions 15a of the insulating material 15 overlap the coated pieces of zinc, the pieces of zinc being large enough to cover most of the area of the bottoms of the cups so that regardless of whether they are accurately centered in the zinc cups, a sufficient amount of overlap is obtained to protect the interior of the zinc cups from contact with the mix cake and the electrolyte contained therein. Thus, with this arrangement the coated zinc pieces constituting the carbon electrodes can simply be dropped into the zinc cups without the necessity of centering them.

In the form of the invention shown in Figures 11 and 12, the construction is again similar to that previously described insofar as the cups 11, mix cake 12, battery papers 13 and insulating sheet material 15 are concerned, but here the carbon electrode 54 is constituted by a piece of conductive rubber compound which may comprise a compound of natural or synthetic rubber or rubber-like material containing a sufficient amount of finely divided carbon to give it the required conductivity. The rubber is produced in sheet form and cut into pieces such as shown in Figure 12 which, like the coated zinc electrodes of Figure 10, are large enough so that they center themselves sufficiently within the zinc cups 11 and are overlapped by the portions 15a of the insulating sheets 15. Thus the electrodes 54, like the coated zinc pieces 51, may simply be dropped into the zinc cups without requiring careful centering.

It will be noted that in each form of the invention the positive electrode is constituted by a thin carbonaceous layer which occupies little volume within the zinc cup, the thickness being of the order of a few thousandths of an inch. At the same time the layers are impervious to the electrolyte and present substantial areas of contact to both the mix cake and the zinc cup. The reduction in volume of the carbon electrode permits the use of a greater amount of mix cake within each zinc cup which is advantageous from the standpoint of the life of the battery, while the thinness of the carbonaceous layers combined with their large areas results in a reduction in the resistance of the cells and a corresponding increase in efficiency. In all modifications, the positive electrode elements can be manufactured economically and are of such nature that no great amount of accuracy is required in assembling the cells.

Those skilled in the art will appreciate that various changes and modifications can be made in the preferred forms of the invention described herein without departing from the spirit and scope of the invention. It is intended that the patent shall cover by suitable expression in the appended claims whatever features of patentable novelty reside in the invention.

I claim:

1. A dry cell battery unit comprising a plurality of dry cells arranged in series stacked relation, each cell comprising a shallow zinc cup having a bottom and side walls, the height of the side walls being less than the distance between the bottoms of adjacent cups, whereby the side walls of adjacent cups do not overlap, a mass of mix containing electrolyte within the cup, a thin positive electrode of substantially uniform thickness substantially coextensive with the interior of the bottom of the cup, the mass of mix contained in each cup being in contact with the positive electrode within the cup, a sheet of separately formed plastic insulating material overlapping the edges of the positive electrode and extending directly between the mass of mix within the cup and the side walls of the cup and insulating the mass of mix from the cup except for the electrical connection provided by the positive electrode, there being a layer of battery paper disposed between the mix of one cup and the outside bottom wall of the next adjacent cup, the sheet of plastic insulating material projecting beyond the edges of the cup within which it extends and along the outside of the side walls of the next adjacent cup and thereby insulating the stacked zinc cups from each other.

2. A dry cell battery unit according to claim 1 wherein the positive electrode consists in a thin coating of a carbonaceous varnish or lacquer, the coating being conductive and impervious to the electrolyte contained in the mix.

3. A dry cell battery unit according to claim 2 wherein the carbonaceous coating is directly in contact with the interior surface of the zinc cup.

4. A dry cell battery unit according to claim 3 wherein the carbonaceous coating is coextensive with the entire interior surface of the zinc cup.

5. A dry cell battery unit according to claim 1 wherein the positive electrode comprises a thin piece of metal foil having a thin coating of a carbonaceous varnish of lacquer on at least one side thereof, the coating being conductive and impervious to the electrolyte contained in the mix, a coated side of metal foil being in contact with the mix and substantially the entire area of the other side of the electrode being directly in contact with the bottom of the cup.

6. A dry cell battery unit according to claim 1 wherein the positive electrode comprises a thin piece of conductive rubber.

7. A dry cell battery unit comprising a plurality of dry cells in series stacked relation, each cell comprising a zinc cup having a bottom and side walls, the height of the side walls being less than the distance between the bottoms of adjacent cups, whereby the side walls of adjacent cups do not overlap, the juncture between the bottom and the side walls of the cup being exteriorly rounded, a mass of mix containing electrolyte within the cup and a thin positive electrode of substantially uniform thickness in engagement with the interior of the bottom of the zinc cup, a layer of battery paper disposed between the mix of one cup and the outside bottom wall of the next adjacent cup and extending beyond the periphery of the mix and at least partially around the rounded juncture of the bottom and side walls thereof, the mass of mix contained in each cup being in contact with the positive electrode within the cup and separately formed plastic sheet insulation impervious to the electrolyte extending within the cup between the mix cake and the cup and overlying the peripheral portions of said positive electrode and the portions of said battery paper that extend around the rounded juncture of the bottom and side walls of the next adjacent cup, said plastic insulation also extending over at least a portion of the exterior of the side walls of the next adjacent cup and insulating said cups from each other.

8. A dry cell battery unit comprising a plurality of dry cells arranged in series stacked relation each cell comprising a zinc cup having a bottom and side walls, the juncture between the bottom and the side walls of the cup being exteriorly rounded, a mass of mix containing electrolyte within the cup and a carbon electrode in engagement with the interior of the bottom of the zinc cup, a separator between the mix within one cup and the outside bottom wall of the next adjacent cup, said separator consisting of a layer of battery paper overlying the mix and extending beyond the periphery of the mix and at least partially around the rounded juncture of the bottom and side walls of the next adjacent cup, the mass of mix contained in each cup being in contact with the carbon electrode within the cup, and separately formed plastic insulation extending within the cup between the mix cake and the side walls of the cup and directly in contact with the mix cake and into contact with the peripheral portions of said positive electrode, said plastic insulation also extending over at least a portion of the exterior of the side walls of the next adjacent cup and insulating said cups from each other.

9. A dry cell battery unit comprising a plurality of dry cells arranged in series stacked relation, each cell comprising a shallow zinc cup having a bottom and side walls, a mass of mix containing electrolyte within the cup, and a thin positive electrode comprising a separately formed sheet of substantially uniform thickness disposed directly in contact with the interior of the bottom of the cup, said sheet being impervious to electrolyte and having a carbonaceous surface in contact with the lower surface of the mass of mix contained in the cup, separately formed plastic insulating material disposed between the mix and the cup and overlying the peripheral portions of said electrode and insulating the mix from the cup except for the electrical connection provided by said positive electrode, there being a layer of battery paper disposed between the mix of one cup and the outside bottom wall of the next adjacent cup, and said plastic insulating material insulating the stacked zinc cups from each other.

10. A dry cell battery unit according to claim 9 wherein the positive electrode consists of a thin sheet of conductive rubber.

11. A dry cell battery unit according to claim 9 wherein the positive electrode consists of a thin sheet of zinc foil, at least one surface of which is coated with a carbonaceous conductive lacquer or varnish.

ARTHUR F. ROCK.

References Cited in the file of this patent

UNITED STATES PATENTS

| Number | Name | Date |
| --- | --- | --- |
| 1,737,130 | Storey et al. | Nov. 26, 1929 |
| 1,888,762 | Greer | Nov. 22, 1932 |
| 2,154,312 | MacCallum | Apr. 11, 1939 |
| 2,375,875 | Sanderson | May 15, 1945 |
| 2,416,576 | Franz et al. | Feb. 25, 1947 |
| 2,463,089 | Deibel | Mar. 1, 1949 |
| 2,505,835 | Richardson et al. | May 2, 1950 |

FOREIGN PATENTS

| Number | Country | Date |
| --- | --- | --- |
| 226,806 | Great Britain | Dec. 17, 1924 |
| 554,926 | Great Britain | July 26, 1943 |
| 558,207 | Great Britain | Dec. 24, 1943 |
| 564,264 | Great Britain | Sept. 20, 1944 |
| 902,205 | France | Nov. 27, 1944 |